United States Patent
Maresco

(10) Patent No.: US 6,418,458 B1
(45) Date of Patent: Jul. 9, 2002

(54) OBJECT-ORIENTED PRIORITIZED WORK THREAD POOL

(75) Inventor: Anthony Francis Maresco, San Marcos, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/165,776

(22) Filed: Oct. 2, 1998

(51) Int. Cl.[7] .................................................. G06F 9/00
(52) U.S. Cl. ........................ 709/103; 709/315; 709/317; 709/318
(58) Field of Search ................................ 709/100, 101, 709/102, 103, 104, 105, 106, 107, 315, 317, 318

(56) References Cited

U.S. PATENT DOCUMENTS 5,421,013 A * 5/1995 Smith .......................... 709/102
5,630,128 A * 5/1997 Farrell et al. ................ 709/103

* cited by examiner

Primary Examiner—Majid Banankhah
(74) Attorney, Agent, or Firm—Gates & Cooper

(57) ABSTRACT

A method, apparatus, and article of manufacture for scheduling thread execution in a computer. Defined task queues and work crews, comprising workers to complete assigned tasks, are managed by a manager class. The manager class also creates and manages the creation of threads connecting the workers to the tasks to be performed, therein making thread execution safer and more efficient.

18 Claims, 3 Drawing Sheets

OBJECT-ORIENTED PRIORITIZED WORK THREAD POOL

BACKGROUND OF THE INVENTION

1. Field of the Invention

The invention relates in general to scheduling on computer systems, and more particularly, to an object-oriented, prioritized work thread pool framework.

2. Description of Related Art

In modem computer systems, tasks are typically performed in parallel to increase the performance of computer programs. One such method for performing tasks in parallel is to use multi-threaded programming.

In multi-threaded programming, the execution of a computer program is divided into multiple threads, where a thread is a stream of instructions executed by the computer on behalf of the computer program. Typically, each thread is dispatched separately, and may be executed by a separate processor in a Massively Parallel Processor (MPP) computer system, to perform the task associated with that thread.

Current programming techniques also incorporate object-oriented programming techniques that allow for the creation of classes and instances within classes to organize and delineate methods and attributes. The merger of object-oriented programming and multi-threaded programming creates problems, however, because the management of the multiple threads and their interaction with the object classes and instances becomes difficult. Further, creation of threads as needed generates random threads, which are inefficient and creates programming errors.

It can be seen, then, that there is a need in the art for a managed multi-threaded programming system. It can also be seen, then, that there is a need in the art for a multi-threaded programming system that can be integrated with an object-oriented system. Further, it can be seen that there is a need in the art for managing efficiency and thread safety in a multi-threaded programming system.

SUMMARY OF THE INVENTION

To overcome the limitations in the prior art described above, and to overcome other limitations that will become apparent upon reading and understanding the present specification, the present invention discloses a method, apparatus, and article of manufacture for scheduling thread execution in a computer. First, a task queue and a work crew class are defined in the computer. The work crew class contains workers to complete the tasks. The computer also creates threads to connect the workers to the tasks in the task queue, and manages the creation of threads to prioritize the execution of the tasks. The present invention uses object oriented programming techniques to create and delete instances of tasks, workers, and work crews (groups of workers). The present invention ensures proper and safe thread creation and independently manages work crew objects to prioritize the execution of tasks in the task queue.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to the accompanying detailed description, in which there is illustrated and described specific examples of a method, apparatus, and article of manufacture in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes maybe made without departing from the scope of the present invention.

Overview

The present invention discloses the thread framework for an object-oriented, prioritized work crew thread pool. The present invention provides several independently managed work crews, each containing a pool of thread objects that can execute any number of tasks, as well as multiple types of tasks. The present uses object-oriented programming to provide a manageable, efficient, thread-safe method for working with objects in a multi-threaded environment. The present invention uses work crews to provide a means of managing efficiency and thread safety. The use of multiple work crew objects in the present invention, along with independently managed thread numbers and priorities, increases the efficiency and scalability of programming systems.

Hardware Environment

Figure 1:
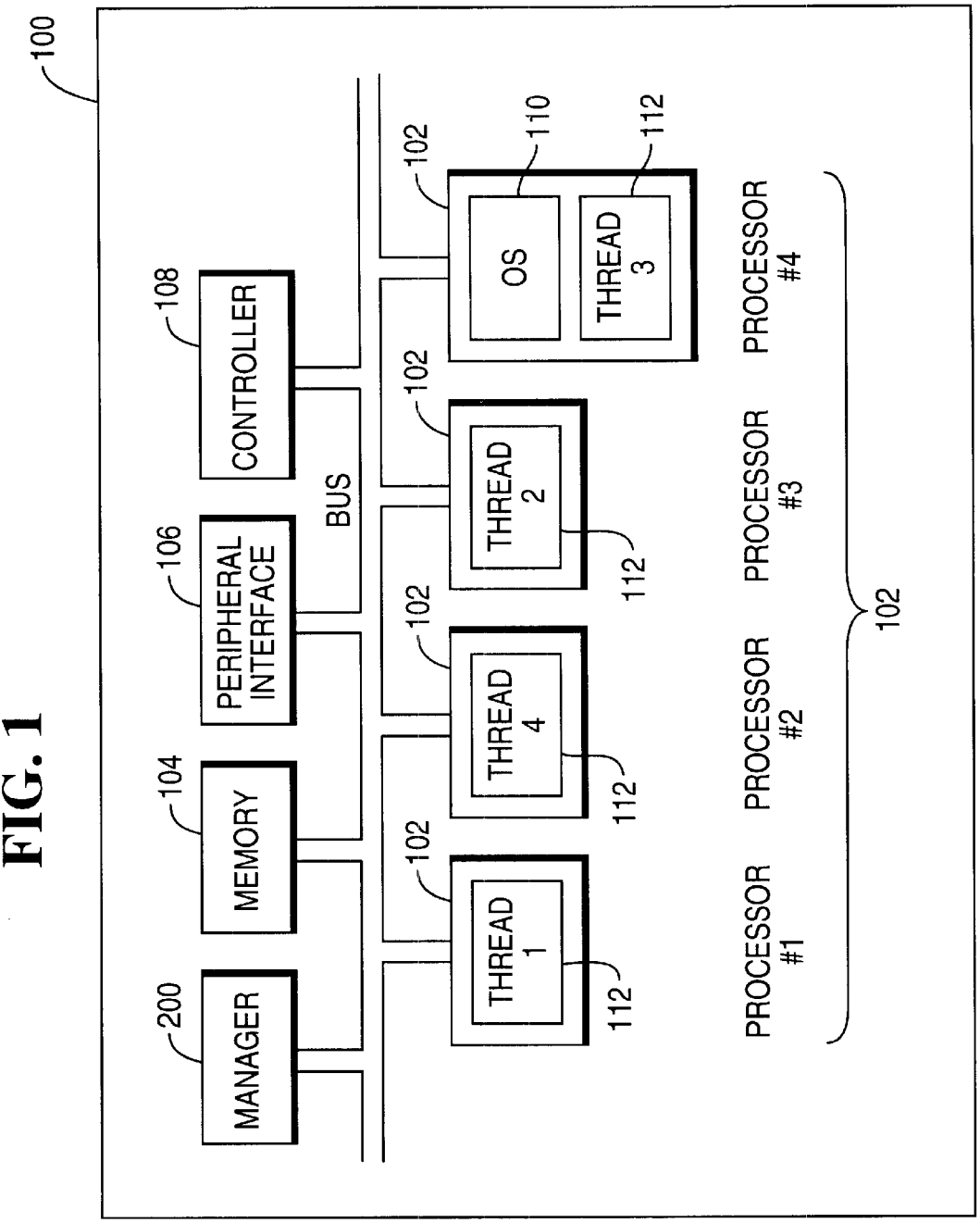
FIG. 1 is a block diagram that illustrates an exemplary hardware environment that could be used with the present invention.

FIG. 1 is a block diagram that illustrates an exemplary hardware environment that could be used with the present invention. In the exemplary hardware environment, a computer system 100 is typically a symmetric multi-processor (SMP) architecture and is comprised of a plurality of processors 102, shared random access memory (RAM) 104, and other components, such as peripheral interfaces 106, controllers 108, etc. The computer system 100 operates under the control of an operating system 110, which in turn controls the execution of one or more program threads 112 on the various processors 102. The operating system 110 also controls manager 200 of the present invention, which manages the thread 112 execution.

In general, the manager 200 comprises data and/or instructions which, when read and executed by the computer system 100, causes the computer system 100 to perform the steps for performing and/or using the present invention. Generally, the data and/or instructions are embodied in and/or readable from a device, carrier, and/or media. For example, the data and/or instructions can be embodied in and/or readable from a memory, data storage device, Application Specific Integrated Circuit (ASIC), remote devices coupled to the computer via a data communications device for downloading a file from a network to the computer as is done in client-server architectures and on the Internet, floppy diskettes, CD-ROM disks, or other magnetic, optical, electronic, or other storage media or devices that can be connected to and interpreted by the computer.

The exemplary environment illustrated in FIG. 1 is not intended to limit the present invention. Indeed, other alternative hardware environments may be used without departing from the scope of the present invention.

Thus, the present invention may be implemented as a method, apparatus, or article of manufacture using standard programming and/or engineering techniques to produce software, hardware, firmware, or any combination thereof. In addition, the term "article of manufacture" as used herein is intended to encompass logic embodied in or accessible from any device, carrier, or media.

Relationships and Operation

Figure 2:
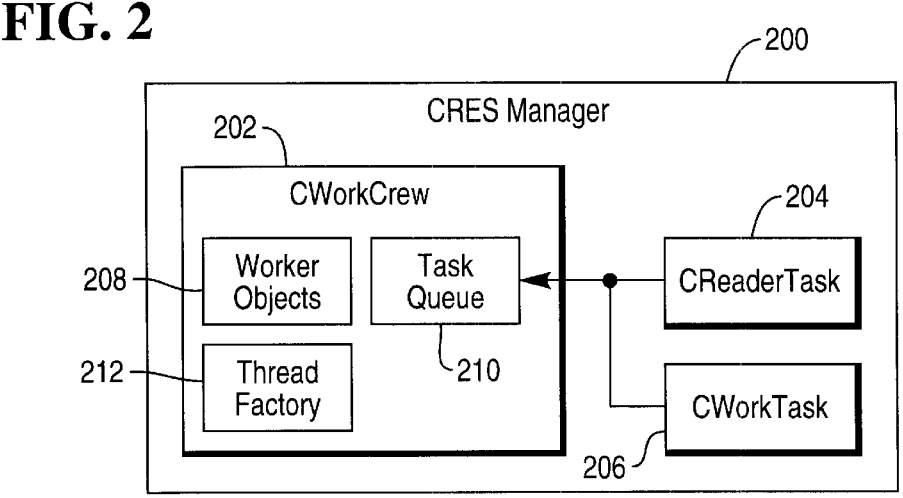
FIG. 2 illustrates the relationships between the objects of the present invention.

FIG. 2 illustrates the relationships between the objects of the present invention. CRESManager 200 is the thread framework manager. CRESManager 200 contains one or more CWorkCrew 202 objects, one or more CReaderTask 204 objects, and one or more CWorkTask 206 objects. CWorkTask 206 objects can also be collected into one or more defined classes if desired.

CWorkCrew 202 contains workers and tasks that are combined for execution. CWorkCrew 202 contains with zero or more CWorker 208 objects, and one or more CTaskQueue 210 objects. The present invention typically uses one CTaskQueue 210, but additional queues can be used. The CTaskQueue 210 object contains zero or more CWorkTask 206 objects. CWorkCrew 202 also contains a CThreadFactory 212 object that can manufacture new worker threads. CRESManager 200 executes tasks that are defined as CWorkTask 206 defined classes in CRESManager 200.

CWorkTask 206 objects and CReaderTask 204 objects are added to CWorkCrew 202 for execution and maintained in a CTaskQueue 210 object. CWorkTask 206 keeps a reference to the CWorker 208 that is executing the task during task execution. CWorkTask 206 maintains its position in the task list for the queue. CWorkTask 206 can also have other associated objects that contain tasks from an external object server that are to be executed within the thread framework.

CWorker 208 encapsulates a system thread where the tasks in CTaskQueue 210 are executed. Each instance (object) of the CWorker 208 class maintains a reference to the work crew (group of CWorkers 208) that each CWorker 208 belongs to. Each CWorker 208 can belong to one or more work crews. Further, each CWorker 208 also keeps track of the next and previous members in the work crews' worker list to which it belongs. Additionally, CWorker 208 maintains a list of requests that it has initiated via associated tasks. If these tasks are not executing when this worker has completed the current task, CWorker 208 will begin executing tasks from its own request list.

The above relationships are analogous to a secretarial pool at a large company. Each secretary (CWorker 208) is a member of the pool (CWorkCrew 202) and can be a member of multiple pools that specialize in certain types of work. As tasks (CWorkTask 206 and CReaderTask 208) enter the inbox of the secretarial pool (CTaskQueue 210) the tasks are assigned to individual secretaries (CWorkers 208) or groups of secretaries (CWorkCrews 210) by the manager of the secretarial pool (CRESManager 200). As secretaries (CWorkers 208) complete their assigned tasks (from the TaskQueue 210), if there are no remaining tasks for them to complete, they can complete tasks from their personal task lists.

CReaderTask 204 is a specialized CWorkTask 206 object. It has an associated Task Generator object that generates special types of objects, and executes these tasks by getting the tasks from its own internal task generator, wraps them in CWorkTask 206 objects and sends these objects to a work crew based on priority.

CRESManager 200 manages multiple CWorkCrews 202 having different prioritizes. Typically, CRESManager 200 manages three prioritized work crews, but the number of work crews can be larger or smaller. The priorities of CWorkCrews 202 are referred to master, fast and slow. As described above in FIG. 2, a work crew (CWorkCrew 202) contains workers 208, pools of threads from the thread factory 212, and a task queue 210. As tasks 204 and 206 are added to the work crew 202, a waiting worker 208 is awoken and assigned the task.

To initialize the manager 200, an instance of each work crew 202, is created, with an initial number of threads for the thread factory 212 that are read from the configuration files. The workers 208 in each work crew 202 are started and the work crew 202 is "joined."

When a new work crew 202 is created, the initial number of worker threads are passed in to the thread factory 212, and a mutex or semaphore is created to provide thread-safe access to the work crew 202 class variables. Further, when the work crew 202 is done with a task, an event (e.g., an interrupt, an event flag, or other notification means) is sent to the work crew 202. When a task has been added to the task queue 210, an event is also created that workers 208 can block on to wake up upon addition of the task.

Each work crew 202 has a specific number of threads and a specific thread type that the thread factory 212 creates for the work crew 202. These threads initialize the work crew 202. The work crew 202 uses the thread factory to create thread classes of the correct type. Creating the class does not create a running thread. Each thread class has a start method to initialize the thread class's thread function. When the event to start a task is given to a worker 208, a system thread is created by the thread factory 212, and the thread factory 212 stores the thread identification (id) in the CWorker 208 class. The CWorker 208 stores a pointer to the work crew 202 and the worker 202 inserts itself into the work crew 202 list of workers 208.

The worker's 208 thread function goes into a loop waiting on events that notify it of either an available task 204 or 206, or that the system wants to shut down. After all work crews 202 and their contained worker threads are started, the workers 208 block (are idle or asleep) until tasks 204 or 206 have been added to the work crew 202.

When a task 204 or 206 is sent to work crew 202 to be executed, task 204 or 206 can receive a priority. The task 204 or 206 will go into the work crew 202 with the matching priority, or into the work crew that is least utilized at the time of the task request. The manager 200 manages the number of threads in each work crew 202 independently. This allows resources to be optimized across work or priorities.

To shutdown the work crew 202, each worker 208 is signaled. Blocked workers 208 are awakened by the signaling event. Once the current (executing) thread is completed, each worker 208 is stopped. Each worker 208 is removed from the work crew 208 list, and the work crew 202 is deleted.

Logic of the Scheduler

Figure 3:
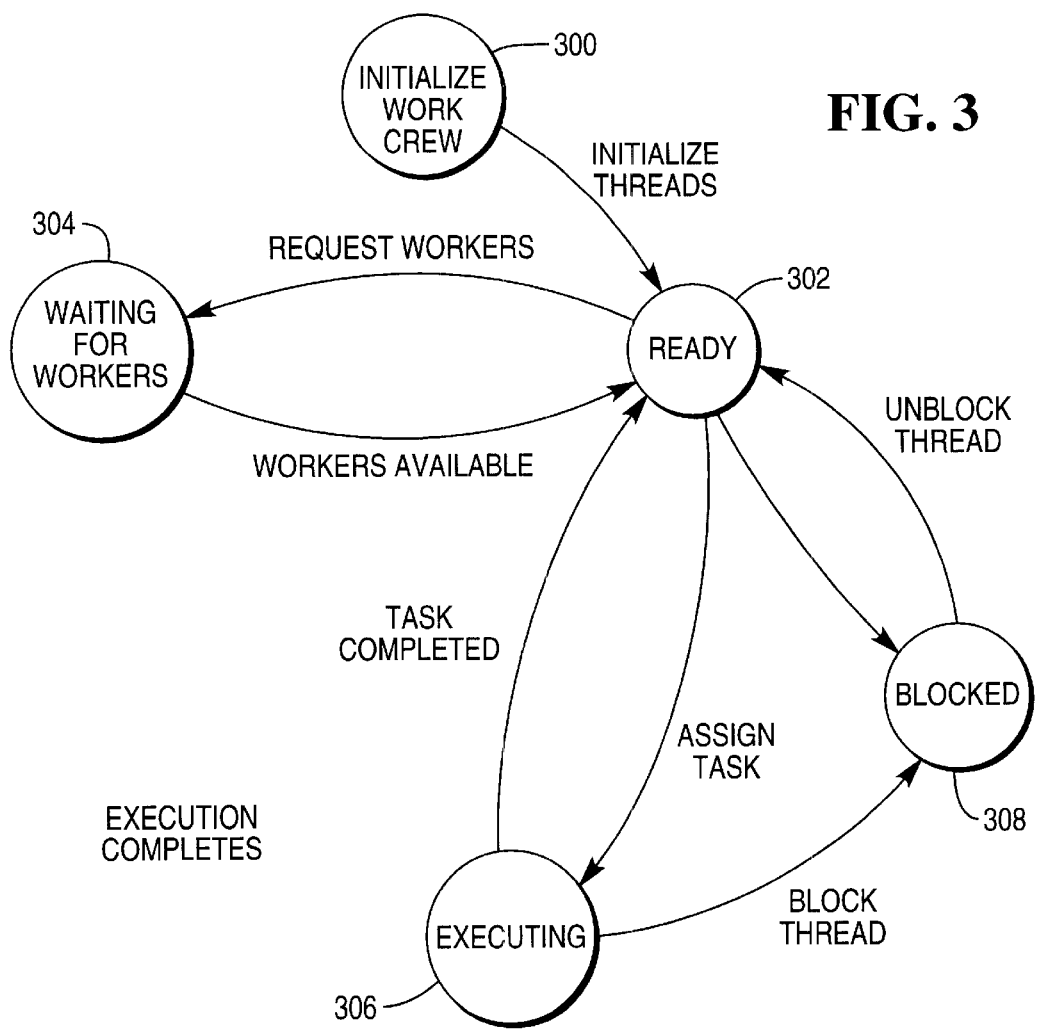
FIG. 3 is a state diagram that illustrates exemplary logic performed by the present invention.

FIG. 3 is a state diagram that illustrates exemplary logic performed by the manager 200 according to the present invention.

A work crew 202 is first initialized at state 300. From state 300, a transition is made to state 302, where the manager 200 initializes the threads needed to ready the work crew 202 for a task to be performed. From state 302, manager 200 may transition to state 304 to wait for workers 208 resources, state 306 to execute a task, or to state 308 to block workers 208. From state 304, the manager 200 transitions back to state 302. From state 306, the manager 200 transitions back to state 302 when the task is completed, or, when the manager 200 is preempted, to state 46 to block workers 208 from completing the task.

Figure 4:
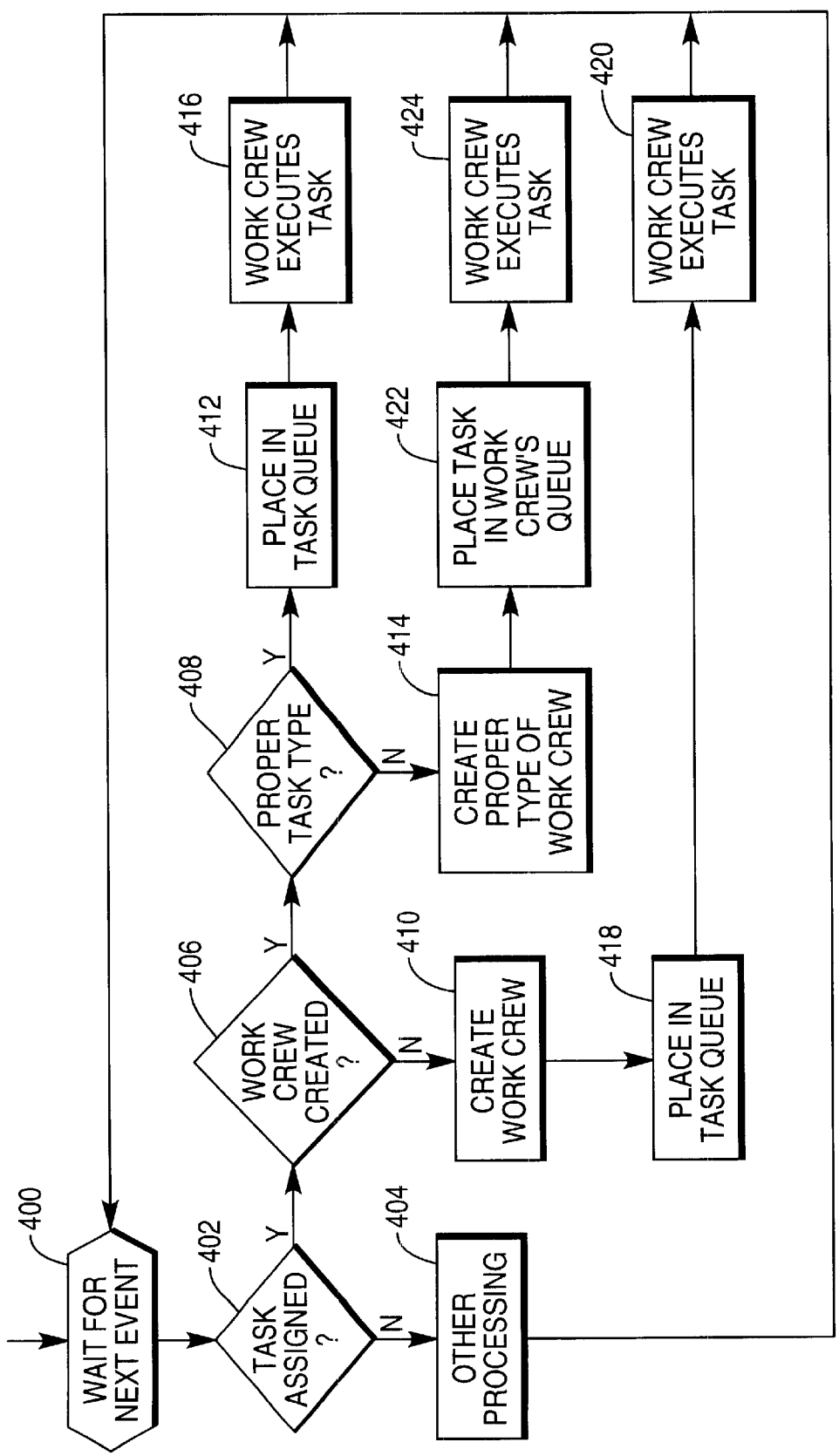
FIG. 4 is a flowchart that illustrates exemplary logic performed by the manager of the present invention during the ready state illustrated in FIG. 3.

FIG. 4 is a flowchart that illustrates exemplary logic performed by the scheduler 24 during the ready state 302. Other logic could be used without departing from the scope of the present invention.

Block 400 represents the manager 200 waiting for the next event to occur. When an event does occur, such as an I/O event, etc., the logic of blocks 402–424 is performed.

Block 402 is a decision block that represents the manager 200 determining whether the event was a task that has been assigned. If not, control transfers to block 404, which represents the manager 200 performing other processing, and then to block 400; otherwise, control transfers to Block 406.

Block 406 is a decision block that represents the manager 200 determining whether there is a work crew 202 created. If so, control transfers to block 408; otherwise, control transfers to block 410.

Block 408 is a decision block that represents the manager 200 determining whether the task assigned is the same type as the type of the work crew 202. If so, control transfers to block 412; otherwise, control transfers to block 414.

Block 412 represents the manager 200 placing the assigned task into task queue 210 associated with the work crew 202. Control then transfers to block 416, where work crew 202 executes the assigned task. Thereafter, control transfers back to block 400.

Block 410 represents the manager 200 creating a work crew 202 to execute the task assigned in block 402, by creating threads and workers to perform the task assigned. Control then transfers to block 418, where the assigned task is placed in the task queue 210 associated with the work crew 202 created in block 410. Control then transfers to block 420, where the created work crew 202 executes the assigned task. Thereafter, control transfers back to block 400.

Block 414 represents the manager 200 creating a work crew 202 of the proper type to execute the task assigned in block 402 by creating threads and workers to perform the assigned task. Control then transfers to block 422, where the assigned task is placed in the task queue 210 associated with the work crew 202 created in block 414. Control then transfers to block 424, where the created work crew 202 executes the assigned task. Thereafter, control transfers back to block 400.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the technique of multi-threading and/or object-oriented programming could benefit from the present invention.

In summary, the present invention discloses a method, apparatus, and article of manufacture for scheduling thread execution in a computer, comprising defining a task queue and a work crew to accept tasks to be executed by the computer. The computer then creates a thread connecting the workers in the work crew to the task to perform the task, and manages the creation of threads to prioritize the execution of the tasks.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of scheduling thread execution in a computer, comprising the steps of:
    (a) defining a task queue containing zero or more tasks to be executed by the computer;
    (b) defining a work crew containing at least one worker object to perform a task from the task queue;
    (c) creating a thread connecting the worker object in the work crew to the task, wherein the thread executes the task; and
    (d) managing the creating step to prioritize the execution of the tasks.

2. The method of claim 1, wherein the step of managing further comprises managing the defining step (b) to further prioritize the execution of the tasks.

3. The method of claim 1, wherein the task queue contains tasks of multiple types.

4. The method of claim 1, wherein the work crew contains more than one type of worker object to complete the tasks in the task queue.

5. The method of claim 1, wherein the step of defining a work crew comprises defining multiple work crews.

6. The method of claim 5, wherein each work crew is assigned a different priority of tasks to perform.

7. A thread execution scheduling device in a computer, comprising:
    (a) means, performed by the computer, for defining a task queue containing zero or more tasks to be executed by the computer;
    (b) means, performed by the computer, for defining a work crew containing it least one worker object to perform a task from the task queue;
    (c) means, performed by the computer, for creating a head connecting the worker object in the work crew to the task, wherein the thread executes the task; and
    (d) means, performed by the computer, for managing the means for creating to prioritize the execution of the tasks.

8. The device of claim 7, wherein the means for managing further comprises means for managing the means for defining (b) to further prioritize the execution of the tasks.

9. The device of claim 7, wherein the task queue contains tasks of multiple types.

10. The device of claim 7, wherein the work crew contains more than one type of worker object to complete the tasks in the task queue.

11. The device of claim 7, wherein the means for defining a work crew comprises means for defining multiple work crews.

12. The device of claim 11, wherein each work crew is assigned a different priority of tasks to perform.

13. A program storage device, readable by a computer, tangibly embodying one or more programs of instructions executable by the computer to perform method steps of scheduling thread execution in a computer, comprising the steps of:
    (a) defining a task queue containing zero or more tasks to be executed by the computer;
    (b) defining a work crew containing at least one worker object to perform a task from the task queue;

(c) creating a thread connecting the worker object in the work crew to the task, wherein the thread executes the task; and (d) managing the creating step to prioritize the execution of the tasks.

14. The program storage device of claim 13, wherein the means for managing further comprises means for managing the defining step (b) to further prioritize the execution of the tasks.

15. The program storage device of claim 13, wherein the task queue contains tasks of multiple types.

16. The program storage device of claim 13, wherein the work crew contains more than one type of worker object to complete the tasks in the task queue.

17. The program storage device of claim 13, wherein the means for defining a work crew comprises means for defining multiple work crews.

18. The program store device of claim 17, wherein each work crew is assigned a different priority of tasks to perform.

* * * * *

UNITED STATES PATENT AND TRADEMARK OFFICE
CERTIFICATE OF CORRECTION

PATENT NO. : 6,418,458 B1
DATED : July 9, 2002
INVENTOR(S) : Maresco, A.

It is certified that error appears in the above-identified patent and that said Letters Patent is hereby corrected as shown below:

Column 6,
Line 41, after "creating a", delete "head" and insert -- thread --

Column 8,
Line 8, after "program" delete "store" and insert -- storage --

Signed and Sealed this

Eleventh Day of January, 2005

JON W. DUDAS
*Director of the United States Patent and Trademark Office*